United States Patent
Sugumar et al.

(10) Patent No.: US 7,340,590 B1
(45) Date of Patent: Mar. 4, 2008

(54) HANDLING REGISTER DEPENDENCIES BETWEEN INSTRUCTIONS SPECIFYING DIFFERENT WIDTH REGISTERS

(75) Inventors: Rabin Sugumar, Sunnyvale, CA (US); Sorin Iacobovici, San Jose, CA (US); Chandra M. R. Thimmannagari, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 357 days.

(21) Appl. No.: 10/734,763

(22) Filed: Dec. 11, 2003

(51) Int. Cl.
G06F 9/312 (2006.01)
(52) U.S. Cl. ........................ 712/216; 712/210
(58) Field of Classification Search ................ 712/216, 712/210, 211; 708/550
See application file for complete search history.

(56) References Cited

U.S. PATENT DOCUMENTS

| | | | |
|---|---|---|---|
| 4,679,140 A * | 7/1987 | Gotou et al. | 712/229 |
| 4,847,802 A * | 7/1989 | Ashton | 708/513 |
| 5,446,912 A * | 8/1995 | Colwell et al. | 712/217 |
| 5,515,520 A * | 5/1996 | Hatta et al. | 708/550 |
| 5,630,149 A * | 5/1997 | Bluhm | 712/23 |
| 5,678,016 A * | 10/1997 | Eisen et al. | 712/216 |
| 5,732,005 A * | 3/1998 | Kahle et al. | 708/495 |
| 5,778,247 A * | 7/1998 | Tremblay | 712/23 |
| 5,790,827 A * | 8/1998 | Leung | 712/216 |
| 5,805,475 A * | 9/1998 | Putrino et al. | 708/204 |
| 6,029,243 A * | 2/2000 | Pontius et al. | 712/222 |
| 6,094,719 A * | 7/2000 | Panwar | 712/216 |
| 6,105,129 A * | 8/2000 | Meier et al. | 712/222 |
| 6,195,746 B1 * | 2/2001 | Nair | 712/217 |
| 6,216,200 B1 * | 4/2001 | Yeager | 711/100 |
| 6,237,076 B1 * | 5/2001 | Gaertner et al. | 712/23 |
| 6,253,312 B1 * | 6/2001 | Elliott et al. | 712/222 |
| 6,442,676 B1 * | 8/2002 | Guenthner | 712/210 |
| 6,449,710 B1 * | 9/2002 | Isaman | 712/216 |
| 6,463,525 B1 * | 10/2002 | Prabhu | 712/222 |
| 6,493,819 B1 * | 12/2002 | Mahurin et al. | 712/210 |
| 7,124,286 B2 * | 10/2006 | McGrath et al. | 712/229 |
| 2002/0174319 A1 * | 11/2002 | Rivers et al. | 712/200 |
| 2004/0148492 A1 | 7/2004 | Sugumar et al. | |

OTHER PUBLICATIONS

U.S. Appl. No. 10/728,039, titled "Method and Processor for Facilitating Greater-Width Store Operations of Lesser-Width Source Values" filed Dec. 4, 2003, naming.as inventors Atula Kalambur et al.

* cited by examiner

*Primary Examiner*—Eric Coleman
(74) *Attorney, Agent, or Firm*—Darby & Darby P.C.; M. David Ream

(57) ABSTRACT

The present application describes a method and a processor for handling register dependency conflicts between lesser and greater width instructions, colloquially referred to as "evil twins." If there is a register dependency between a greater width producer instruction and a lesser width consumer instruction, a greater width source register is substituted for the source register specified by the lesser width producer. If there is a register dependency between a lesser width producer instruction and a greater width producer instruction, the greater width consumer instruction is replaced by multiple helper instructions. One or more of the helper instructions merge lesser width registers aliased onto the source registers specified by the greater width consumer instruction, into temporary registers. Another helper instruction executes the greater width consumer instruction using the temporary registers instead of the original source registers.

30 Claims, 5 Drawing Sheets

HANDLING REGISTER DEPENDENCIES BETWEEN INSTRUCTIONS SPECIFYING DIFFERENT WIDTH REGISTERS

CROSS-REFERENCE TO RELATED APPLICATION(S)

This application is related to patent application Ser. No. 10/353,662 entitled "METHOD FOR HANDLING A MIX OF SINGLE PRECISION AND DOUBLE PRECISION FLOATING POINT INSTRUCTIONS IN AN INSTRUCTION STREAM," filed on Jan. 29, 2003, and of common assignee herewith.

BACKGROUND

1. Field of the Invention

The present application relates to processor architecture, and more particularly to the execution of instructions with complex dependencies between instructions specifying different register widths.

2. Description of the Related Art

Typically, instructions are executed in their entirety in processors to maintain the speed and efficiency of execution. As instructions become more complex (e.g., atomic, integer-multiply, integer-divide, move on integer registers, graphics, floating point calculations or the like) the complexity of the processor architecture also increases accordingly. Additionally, complex data dependencies between instructions increase the complexity of the processor architecture. For example, when a first instruction produces a result that is needed as an input for execution of a second instruction, dependency logic can be used to ensure that the first instruction result is available before execution of the second instruction seeks to operate thereon. Dependencies become even more complex when lesser width (e.g. single precision) consumer instructions depend on the results of greater width (e.g. double precision) producer instructions, or conversely, when greater width consumer instructions depend on the results of one or more lesser width producer instructions.

Most current processors handle dependencies between greater width and lesser width instructions by using a rename unit to establish dependencies, and an issue unit to keep track of when dependencies have been satisfied. Tracking dependencies between lesser width instructions and greater width instructions using the rename and issue units can require tracking complex register dependencies, and may require increased complexity in rename and issue units. In some out of order processors, for example, establishing dependencies in the rename and issue unit requires that the dependent instruction be compared against all instructions in the issue queue. Additionally, forcing dependencies between instructions specifying different width registers can require a large amount of additional logic.

Complex processor architectures often consume extensive silicon area in the semiconductor integrated circuits, with more complex architectures generally requiring more silicon area than less complex architectures. Consequently, the more complex logic used by many conventional architectures to handle dependency issues between lesser width and greater width instructions can consume greater amounts of silicon area. Apparently, therefore, a method and/or system allowing processors to execute instructions having dependencies between lesser and greater width instructions, without consuming an unnecessarily large amount of silicon area, would be advantageous.

SUMMARY

Clarification of the following terms may prove useful in understanding the following disclosure. The terms "dependency," "instruction dependency," "dependency conflict," and "register dependency" are used interchangeably herein, and refer generally to read after write (RAW) dependencies, write after read (WAR) dependencies, and similar dependencies known to those skilled in the art. The terms "conflict," "dependency," "register dependency," and similar terms are not intended to refer only to situations in which multiple instructions are trying to access a particular register or part of a register at the same time. Instead, "conflict" and related terms include situations in which a lesser width producer/consumer instruction and a double precision consumer/producer instruction, respectively, reference the same register. The term "conflict" also refers to situations in which a particular register may not be accessed before that register commits to an architectural state, and similar situations.

As used herein, the terms "lesser width instruction", "greater width instruction", and variants thereof are used to refer to instructions having register specifiers indicating lesser width registers or greater width registers, respectively. One common use of greater and lesser width registers is found in processors that perform both single precision and double precision floating point operations.

Single precision floating point (SPFP) operations use 32 bit registers, while double precision floating point (DPFP) operations use 64 bit registers. Thus, the SPFP instructions may be referred to as "lesser width" instructions, while the DPFP instructions may be referred to as "greater width" instructions. It will be appreciated, however, that "lesser width" and "greater width" are not limited to SPFP and DPFP instructions. Instead, a lesser width instruction refers generally to any instruction that specifies a logical register having fewer bits than a logical register specified by a greater width instruction. It should be understood, therefore, that although the following disclosure refers to single precision and double precision instructions and registers for ease of discussion, embodiments using any of various suitable lesser and greater width instructions and/or registers may also be implemented according to the teachings set forth herein.

The present application describes techniques for handling register dependency conflicts between greater and lesser width instructions (e.g. single and double precision instructions), colloquially referred to as "evil twins." Such register dependency conflicts for "evil twins" are handled differently depending on whether the register dependencies are between single precision (lesser width) producers and double precision (greater width) consumers, or between double precision (greater width) producers and single precision (lesser width) consumers.

In at least one embodiment, if there is a register dependency between a greater width producer instruction and a lesser width consumer instruction, a greater width source register specifier is substituted for the source register specifier of the lesser width producer instruction, thereby avoiding any dependency between lesser and greater width instructions. The greater width source register specifier substituted for the lesser width source register specifier corresponds, in one embodiment, to the greater width register onto which the lesser width source register is aliased.

In one form, if there is a register dependency between a lesser width producer instruction and a greater width consumer instruction, the greater width consumer instruction is replaced by multiple microinstructions, referred to herein as helper instructions. The helper instructions reach the same end result as the greater width instruction being replaced, but avoid complex register dependencies between lesser and greater width instructions. The helper instructions used in one embodiment include multiple instructions to merge multiple lesser width registers, which are aliased onto the source registers specified by the greater width consumer instruction, into temporary registers. Another helper instruction then executes the greater width consumer instruction using the temporary registers instead of the original source registers.

In another embodiment, where both lesser and greater width producer instructions that write to a particular register are active in a pipeline, a consumer instruction specifying that particular register as a source will stall the decoding of any further instructions until at least one of the active producer instructions is retired.

The existence of dependencies is determined, in one embodiment, by checking the register specified by a lesser width instruction against a register mask that indicates which greater width registers are being modified by active instructions. Alternatively, the register specified by a greater width instruction is checked against a register mask that indicates which lesser width registers are being used by active instructions. In other embodiments, the existence of dependency conflicts can be determined by checking to see if a greater width instruction in a fetch group modifies a lesser width source register specified by a younger instruction in the same fetch group, or by checking to see if a lesser width instruction in a fetch group modifies a greater width source register specified by a younger instruction in the same fetch group.

In another form, the invention may be implemented as a processor. Such a processor includes an instruction decode unit including counters to track a number of register modifying instructions active in a pipeline, mask registers to hold vectors indicating which registers are being modified by active instructions, and conflict determination logic. The conflict determination logic compares destination and source registers specified by instructions against at least one of the mask registers to determine if a dependency exists between an instruction being decoded and an active instruction. The instruction decode unit also includes substitution logic to substitute a double precision source register specifier for a single precision source register specifier, or to substitute helper instructions for a double precision consumer instruction, as appropriate.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
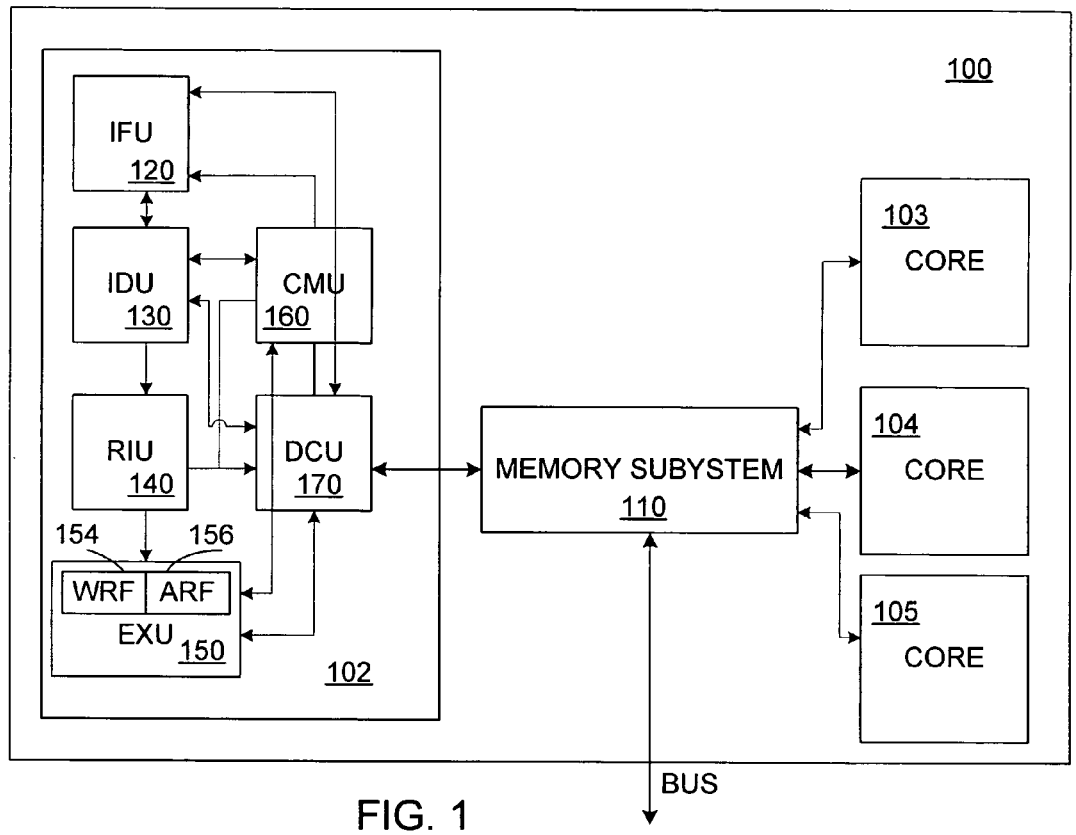
FIG. 1 is a block diagram of a processor according to an embodiment of the present invention.

FIG. 1 illustrates an example of a processor architecture according to an embodiment of the present invention. A processor according to various embodiments can be any type of processor (e.g., general purpose, out-of-order, very large instruction word (VLIW), reduced instruction set processor or the like), including a multiple-core superscalar processor such as processor 100. Processor 100 includes four processing cores 102-105 and memory subsystem 110. Memory subsystem 110 obtains instructions and data stored in an external memory (e.g., cache, main memory, peripheral storage, or the like) and distributes the instructions and data for use by cores 102-105. Memory subsystem 100 is also responsible for providing data to memory operations which experience level 1 cache misses, and for maintaining cache coherency.

All of the cores 102-105 are, in one embodiment, substantially identical to each other, so the operation of a single core 102 will be used as an example of how each of the cores 102-105 function. Core 102 includes data cache (DCU) 170, commit unit (CMU) 160, instruction fetch unit (IFU) 120, instruction decode unit (IDU) 130, rename issue unit (RIU) 140, and one or more execution units (EXU) 150. DCU 170 loads/stores instructions and data from/to memory subsystem 110. IFU 120 fetches up to three instructions (referred to as a fetch group) in any given cycle, and provides these instructions to IDU 130 for decoding and handling "evil twin" register or instruction substitutions as subsequently described herein. Decoded instructions are provided by IDU 130 to RIU 140, where most register fields are renamed and checked for dependencies before being issued to execution unit 150. Execution unit 150 executes the instructions and writes the results to working register file (WRF) 154. Once a result is ready to be committed to the architectural state (i.e. the instruction has finished executing without exceptions and the results are no longer speculative) CMU 160 transfers the result held in WRF 154 to the appropriate register in the architectural register file (ARF) 156.

The specific structure and arrangement of DCU 170, CMU 160, IFU 120, RIU 140, EXU 150, and memory subsystem 110 may vary depending on the particular processor implementation being considered. Design and fabrication of these elements, in general, is within the abilities of one skilled in the art. Likewise, one skilled in the art can construct an IDU implementing the basic decoding functionality found in conventional processors. An IDU 130 according to an embodiment of the present invention, however, includes certain features not found in more conventional IDUs. Even so, however, upon consideration of the teachings set forth herein, various ways of constructing an IDU implementing these non-conventional features will become apparent.

Figure 2:
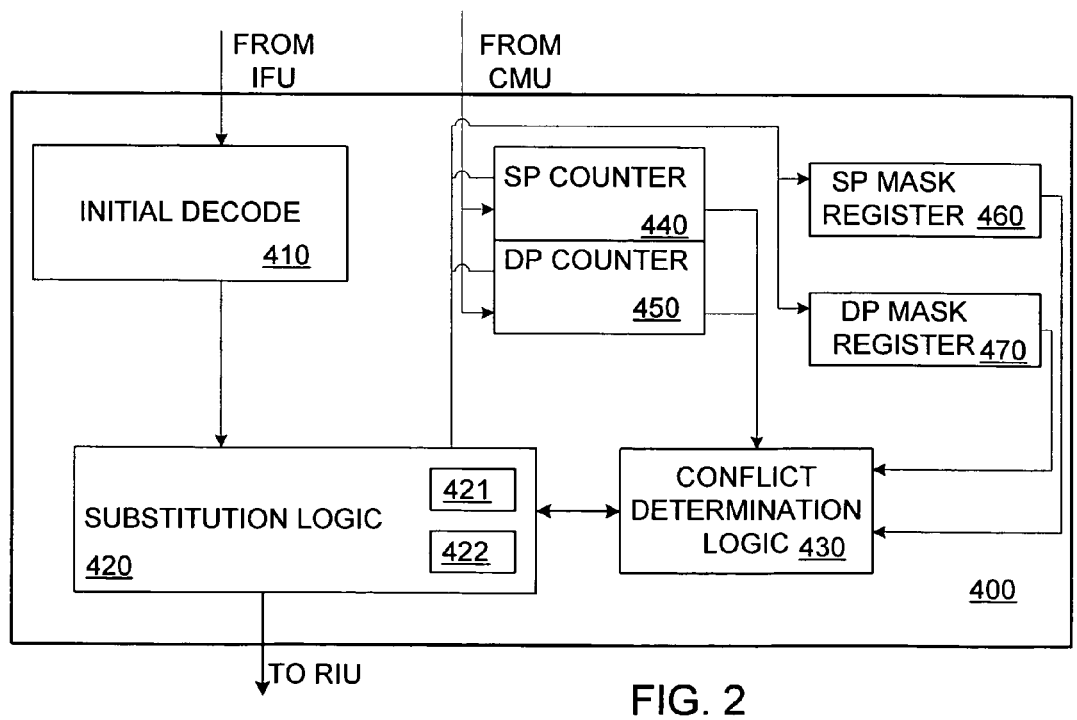
FIG. 2 is a block diagram of an instruction decode unit (IDU) according to an embodiment of the present invention.

Referring next to FIG. 2, an IDU according to one embodiment of the present invention will be discussed. IDU 400 includes initial decode unit 410 coupled to substitution logic 420. Substitution logic 420 is connected to conflict determination logic 430, SP counter 440, DP counter 450, SP mask register 460, and DP mask register 470. Initial decode 410 receives one or more instructions from an instruction fetch unit (IFU) and decodes the instructions by effectively separating the operational code from the source and destination specifiers. A typical instruction may include fields identifying, for example, an operational code specifying an action to perform (e.g. add, load, store, and the like), one or two source specifiers indicating where the information to be acted on is held, and a destination specifier indicating where the instruction result is to be placed. In many processors, including various embodiments of the processor discussed herein, the source and destination specifiers indicate particular registers.

The decoded instructions are passed from initial decode 410 to substitution logic 420, which forwards either the originally decoded instruction (e.g. without substitutions) or one or more substitute instructions (e.g. either substitute register specifiers or helper instructions) to a rename issue unit (RIU). The original instruction is passed to the RIU if there is no single precision (SP)/double precision (DP) register conflict associated with the decoded instruction. One or more substitute instructions are generally passed if an SP/DP register conflict is associated with the decoded instruction. In some cases, if the decoded instruction conflicts with both SP and a DP producer instructions, substitution logic 420 causes IDU 400 to stall until at least one of the instructions with which the decoded instruction conflicts is committed.

In one embodiment, substitution logic 420 includes a memory 421, for example a read only memory, which holds a number of helper instructions to be substituted for a DP instruction if a SP producer, DP consumer dependency conflict exists. So, for example, if conflict determination logic 430 indicates an SP producer, DP consumer dependency, substitution logic 420 discards the original DP consumer instruction, and sends the helper instructions stored in memory 421 to the RIU in place of the original DP consumer instruction.

Substitution logic 420 may also include a multiplexer 422 and associated control logic to select which register specifiers to send to the RIU in the event of a dependency between a DP producer and an SP consumer. For example, an instructions opcode and register specifier are passed to substitution logic 420 from initial decode 410. If conflict determination logic 430 indicates a DP producer/SP consumer conflict, logic 420 may discard the original source register specifier of the SP instruction, and replace the discarded specifier with a double precision register specifier. This modified instruction is then forwarded to the RIU.

It should be appreciated that while specific logic gates and a particular arrangement thereof are not enumerated herein, one skilled in the art, upon consideration of the present disclosure, could employ various logical configurations to implement various embodiments of the present invention.

Conflict determination logic 430 determines whether or not a conflict exists by using information contained in SP counter 440, DP counter 450, SP mask register 460, and/or DP mask register 470. SP counter 440 holds the number of active SP modifying instructions in the pipeline, and DP counter 450 holds the number of active DP modifying instructions in the pipeline. Whenever substitution logic 420 sends an instruction that will modify an SP or DP register (i.e. a producer instruction) to the RIU, the appropriate counter is incremented. Whenever an SP or DP modifying instruction is completed, the completion unit (CMU) decrements the appropriate counter.

SP mask register 460 and DP mask register 470 indicate which registers in ARF 156 (FIG. 1) are being modified by the active SP or DP instructions respectively. So, for example, if an active SP instruction is modifying register 13 (not illustrated) and a DP instruction is modifying register 10 (not illustrated), then, in at least one embodiment, bit 13 of SP mask register 460 is set and bit 5 of DP mask register is set. For a more detailed discussion of SP counter 440, DP counter 450, SP mask register 460, and DP mask register 470, refer to commonly owned and co-pending application Ser. No. 10/353,662, entitled "METHOD FOR HANDLING A MIX OF SINGLE PRECISION AND DOUBLE PRECISION FLOATING POINT INSTRUCTIONS IN AN INSTRUCTION STREAM," filed on Jan. 29, 2003, of which FIGS. 6-12 and the accompanying disclosure, which pertain primarily to the structure of a decode unit and methods for using the decode unit to evaluate single and double precision instructions, are incorporated herein by reference.

Figure 3:
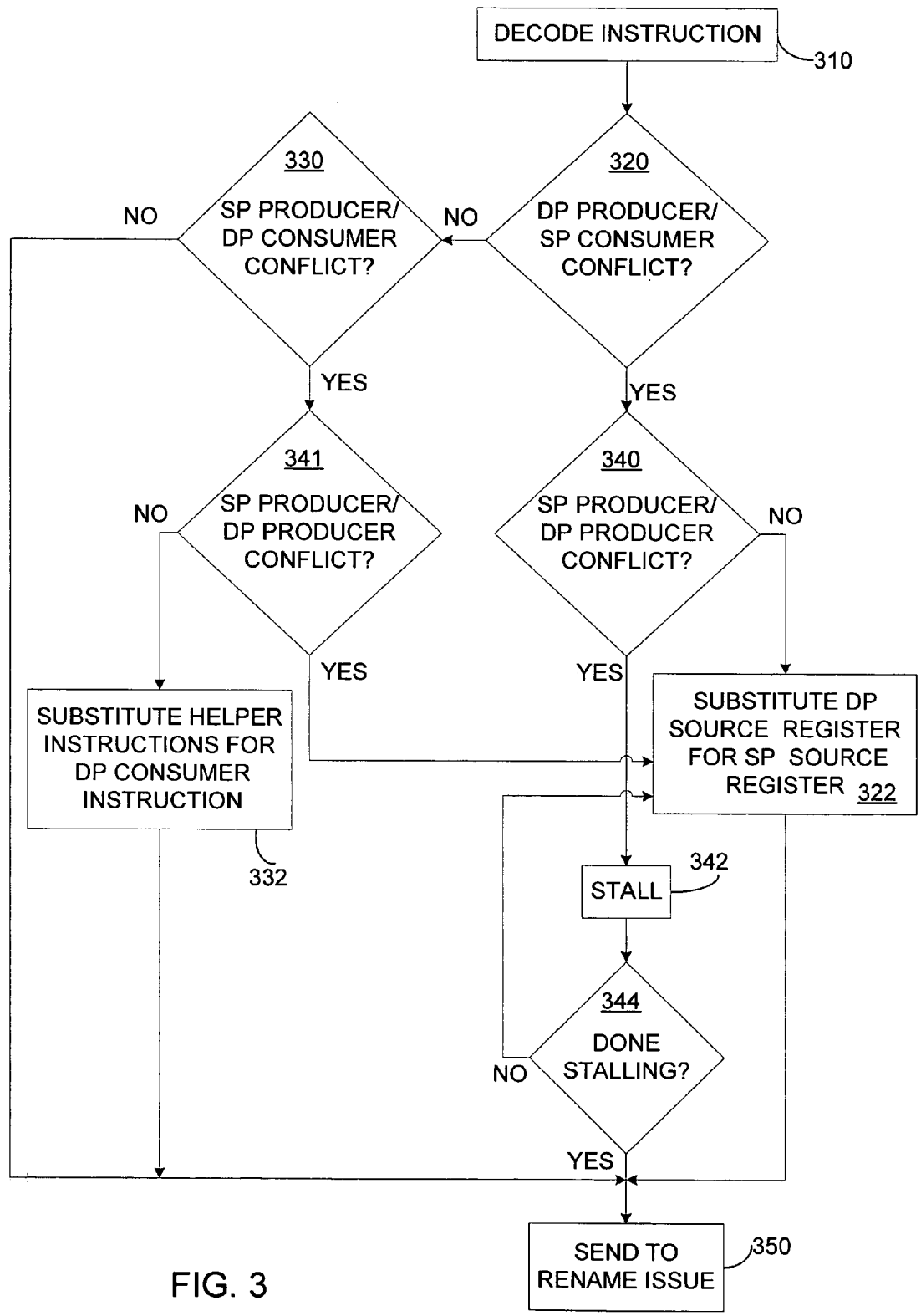
FIG. 3 is a flow diagram illustrating a method of handling register dependency conflicts between single precision and double precision instructions according to an embodiment of the present invention.

Referring next to FIG. 3, a method of determining whether an "evil twin" type conflict, i.e. a register conflict involving single and double precision registers, exists will be discussed according to an embodiment of the present invention. In at least one embodiment, most of method 300 is performed by conflict determination logic 430 (FIG. 2). Method 300 begins by decoding an instruction at 310, so that the source and/or destination specifiers can be examined. At 320, the method determines whether there is a DP producer/SP consumer conflict, meaning that an SP consumer instruction in the fetching group conflicts with either a DP producer instruction in the pipeline, or an older DP producer instruction in the same fetch group. An explanation of the way in which conflict determinations are made is presented subsequently with reference to FIG. 4.

If a DP producer/SP consumer conflict exists, the method checks to see if there is an SP producer/DP producer conflict at 340, meaning that a consumer instruction in the fetch group refers to a register being written to by both an SP instruction and a DP instruction. If there is an SP producer/DP producer conflict, the method stalls at 342, until the SP producer/DP producer conflict is cleared. Once the method determines at 344 that the SP producer/DP producer conflict is cleared, and no further stalling is necessary, the instruction that caused the stall is sent to the rename issue unit at 350.

If the method determines at 340 that there is no SP producer/DP producer conflict (recall that at this point there is a DP producer/SP consumer conflict), the method proceeds to 322. At 322, the source register specified by the SP consumer instruction is replaced by a DP register, in effect making the SP consumer instruction a DP consumer instruction. The modified instruction is then sent to the rename issue unit at 350. By effectively changing the SP consumer into a DP consumer, the DP producer/SP consumer conflict is avoided, since there is no longer an SP consumer involved. In at least one embodiment, the DP register substituted for the SP register is the DP register onto which the SP register is aliased.

Figure 4:
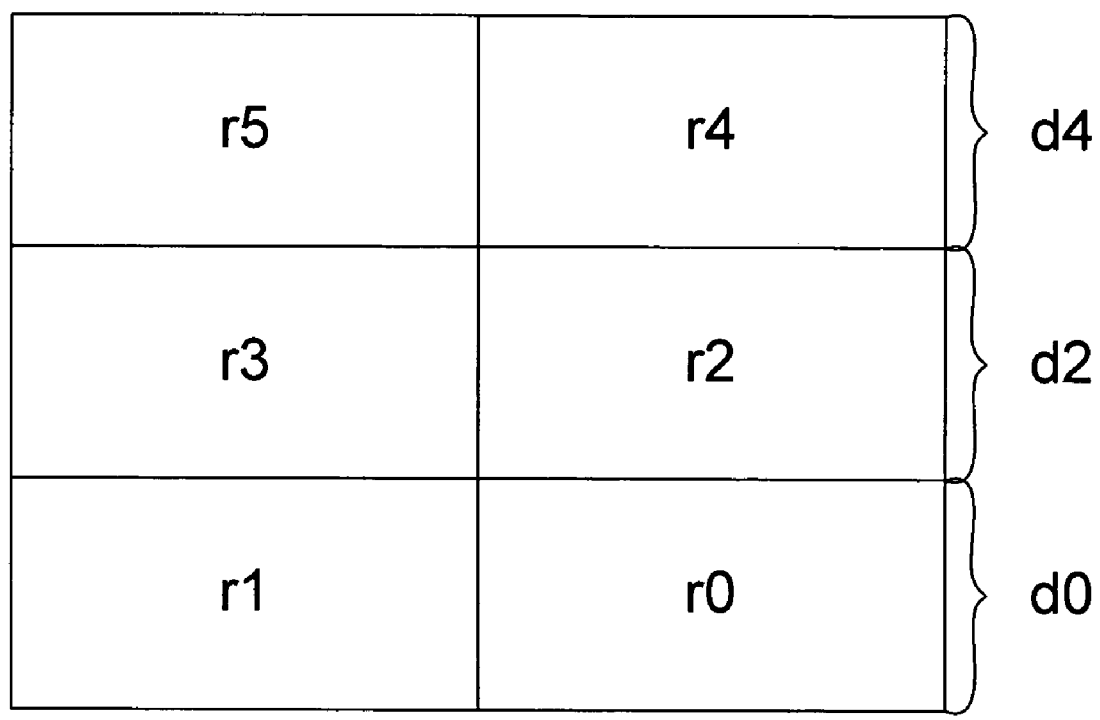
FIG. 4 is a block diagram illustrating register aliasing used in various embodiments of the present invention.

Referring briefly to FIG. 4, for example, SP registers r0-r1 are aliased onto DP register d0. Likewise, SP registers r2-r3 are aliased onto DP register d2 and SP registers r4-r5 are aliased onto DP register d4. In the embodiment being discussed, if the SP consumer specifies SP register r0, and a DP producer/SP consumer conflict exists, then DP register d0 is substituted for SP register r0. In a similar fashion, if a DP register is to be substituted for SP register r3, DP register d2 will be used.

Referring again to FIG. 3, if method 300 determines at 320 that there is no DP producer/SP consumer conflict, then the method continues on to 330. At 330, method 300 checks for the existence of an SP producer/DP consumer conflict, meaning that a DP consumer in the fetch group being decoded conflicts with either an SP Producer instruction active in the pipeline, or an older SP producer instruction in the same fetch group. If there is an SP producer/DP consumer conflict, the method checks for an SP producer/DP producer conflict at 341 in the same way it checked at 340. If there is an SP producer/DP producer conflict, the method stalls at 342, until the SP producer/DP producer conflict is cleared. Once the method determines at 344 that the SP producer/DP producer conflict is cleared, and no further stalling is necessary, the instruction that caused the stall is sent to the rename issue unit at 350.

If, however, it is determined at 341 that there is no SP producer/DP producer conflict (recall that at this point there is an SP producer/DP consumer conflict), helper instructions are substituted for the DP consumer instruction at 332. In at least one embodiment, three helper instructions are substituted for the single DP consumer instruction. The number of helper instructions used is based on the assumption that the DP consumer instruction specifies two DP source registers and a DP destination register. A different number of helper instructions may be used under different circumstances.

Recall from FIG. 4 that in a system employing register aliasing, there are multiple SP registers aliased onto each DP register (e.g. r0-r1 are aliased onto d0). The first of the three helper instructions merges both of the SP registers aliased onto the first DP source register specified by the decoded instruction into a first temporary DP register (not illustrated). The second of the three helper instructions merges both of the SP registers aliased onto the second DP source register specified by the decoded instruction into a second temporary register (not illustrated). The third helper instruction performs the original action specified by the decoded instruction, except using the temporary source registers in place of the originally specified source registers.

Refer to FIGS. 3 and 4 in considering the following example according to one embodiment. Assume that the instruction being processed is a double precision floating point add instruction (faddd) specifying d0 and d2 as source registers, and d4 as the destination. For an SP producer/DP consumer conflict, the method will split the faddd instruction into three helper instructions at 322. In this example, the first helper instruction is a floating point single precision merge instruction (fmergesp) specifying registers r0 and r1 as sources, and a temporary register ftmp0 (not illustrated) as the destination. The fmergesp instruction will merge (e.g. by concatenation) the two SP registers comprising the DP register d0 into a different, temporary double precision register ftmp0. The second helper instruction is also an fmergesp instruction, but specifying registers r2 and r3 as sources, and temporary register ftmp1 (not illustrated) as the destination. The third helper instruction is an faddd instruction, the same instruction as the original instruction. The new faddd instruction, however, specifies ftmp0 and ftmp1 as source registers, in place of registers d0 and d2. All three helper instructions are passed to the rename issue unit at 350.

Using a helper sequence according to various embodiments prevents any DP source registers other than temporary source registers from entering the pipe. The temporary registers are non-architectural registers, so they will not be specified as SP destinations, and thus SP producer/DP consumer conflicts are avoided. Note that once the helper instructions are passed to the rename issue unit at 350, the registers specified by the two fmergesp instructions will be renamed and accessed like any other SP registers. Also note that since the helper instructions are, in one embodiment, in the same fetch group, an intra-group renaming mechanism, various ones of which are known to those skilled in the art, can be used to handle renaming the DP source registers to ftmp0 and ftmp1.

Figure 5A:
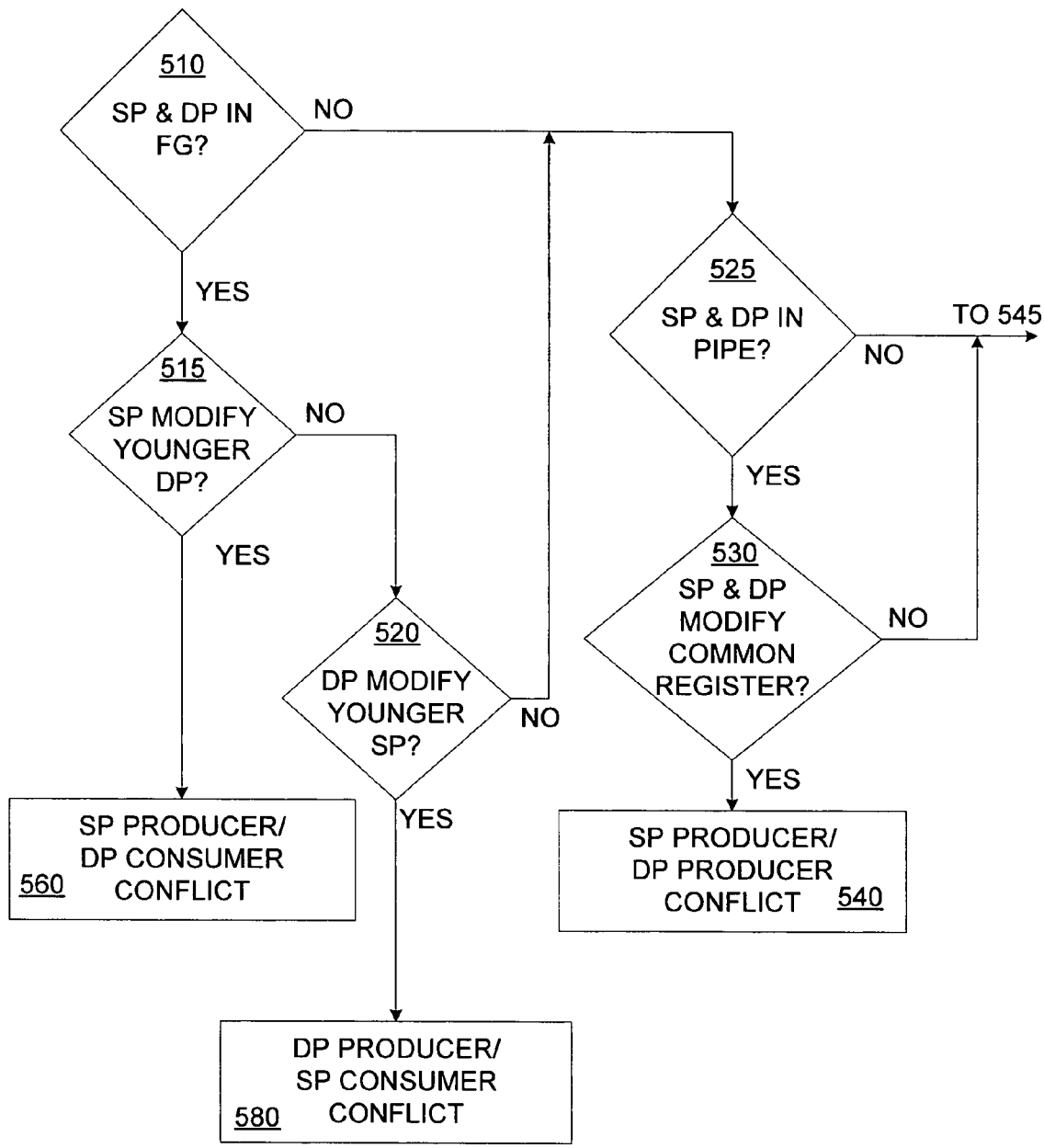
FIGS. 5A and 5B are a flow diagram illustrating a method of determining whether a register dependency exists according to an embodiment of the present invention.
Figure 5B:
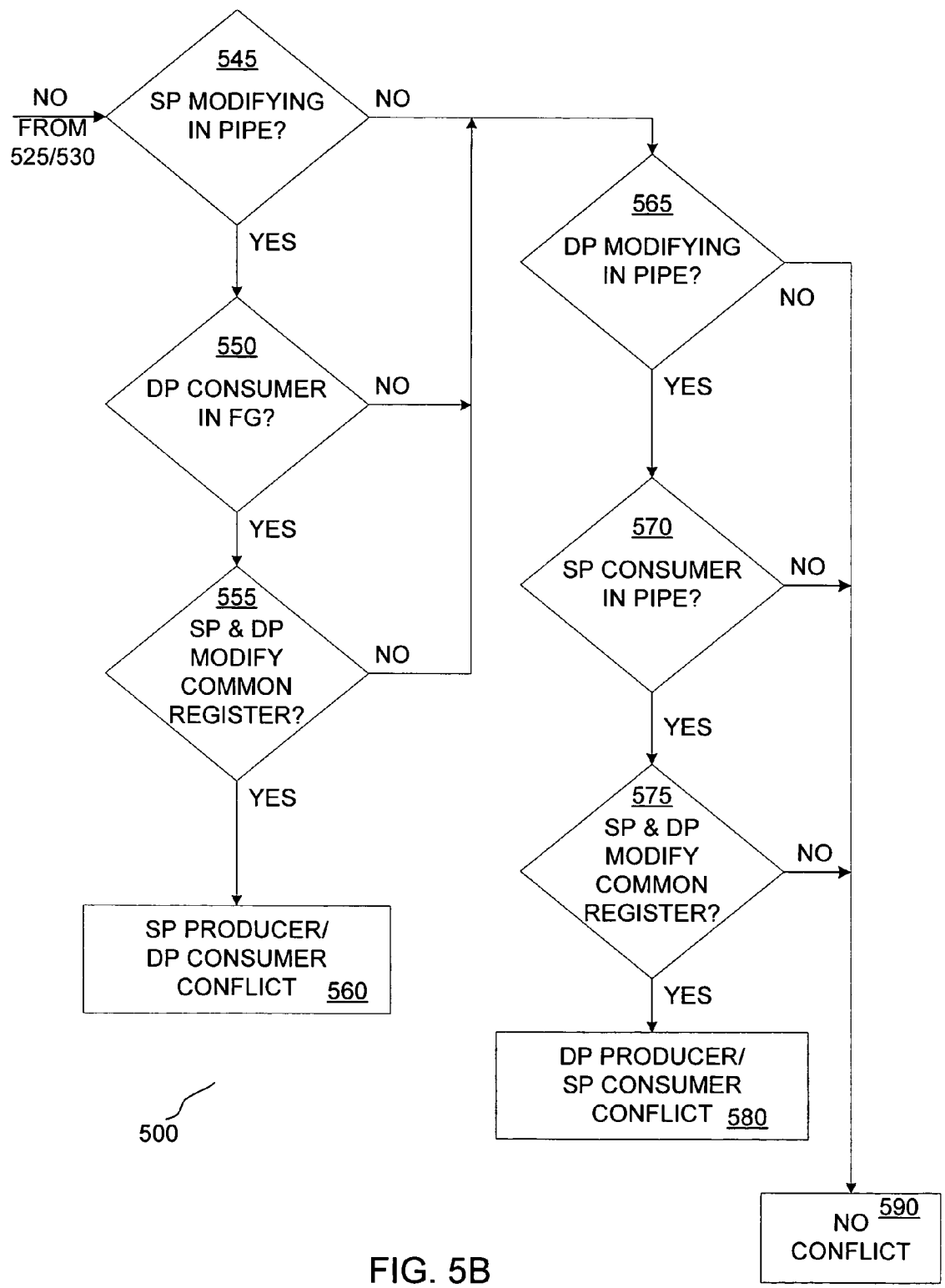

Referring next to FIG. 5, a method of determining whether a register dependency exists between a single precision and double precision instruction is discussed according to an embodiment of the present invention. Method 500 begins by examining instructions in a fetch group (FG). A FG is a collection of instructions that can be executed concurrently by a processor core implementing instruction level parallelism. Based on the description herein, a person of ordinary skill in the art will appreciate a variety of suitable techniques for choosing instructions to be included in a fetch group, and in general, any such techniques may be employed. In one exemplary embodiment, a fetch group includes up to three instructions that may be concurrently executed using different processor execution resources. The instructions in the fetch group may be single precision floating point instructions, double precision floating point instructions, load instructions, store instructions, or any other instruction to be executed by a processor.

Method 500 begins at 510, by checking whether a fetch group includes both single precision and double precision instructions. If the fetch group includes both types of instructions, at 515 the method checks to see if there is a single precision instruction in the fetch group that will modify a source register used by a younger double precision instruction. Note that the term "younger" refers to an instruction that would be executed later in time than older instructions assuming the instructions are executed in program order. So, for example, assume that program order indicates a double precision consumer instruction (younger) is to be executed after a single precision producer instruction (older) in the same fetch group. If the younger double precision source is to read from the same register where the result of older single precision instruction is destined, then an SP producer/DP consumer conflict exists. In that case, method 500 will proceed to 560, where an indication of the SP producer/DP consumer conflict is generated.

If method 500 determines at 515 that there is no older single precision instruction in a FG modifying a source register of a younger double precision register in the same FG, then the method proceeds to 520. At 520, the method determines whether there is an older double precision producer instruction in a FG modifying a source register used by a younger single precision register in the same FG. If so, then the method proceeds to 580, and generates an indication that a DP producer/SP consumer conflict exists. If there is no older double precision producer instruction in the FG modifying a source register used by a younger single precision instruction in the same FG, the method proceeds to 525.

At 525, the method 500 checks whether both single precision and double precision instructions are currently active in the pipeline. In at least one embodiment, counters such as those previously discussed with reference to FIG. 2 can be used to track the number of modifying instructions of each type active in the pipeline. If the method determines at 525 that both single precision and double precision modifying instructions are active in the pipeline, the method proceeds to 530.

At 530, the destination registers of both the SP and the DP modifying instructions that are active in the pipeline are compared with the source specifiers of the instruction currently being decoded. In at least one embodiment, SP and DP mask registers (460 and 470, respectively, FIG. 2) are used to determine which registers are being modified by instructions in the pipeline. If the single precision instruction and the double precision instruction both modify a common register, and if an instruction being currently decoded specifies that common register as a source, then an SP producer/DP producer conflict exists, and the method proceeds to 540. At 540 the method generates an indication, e.g. asserts a signal, sets a control bit, or the like, that an SP producer/DP producer conflict exists. If no SP producer/DP producer conflict is identified, then the method proceeds to 545 to begin checking for an SP producer/DP consumer conflict.

At 545, the method checks whether there are any active SP modifying instructions in the pipe. In at least one embodiment SP counter 440 and DP counter 450 (FIG. 2) are used for this purpose. If there are one or more active SP modifying instructions in the pipe, the method proceeds to 550. At 550, the method determines if there is a double precision consumer instruction in the fetch group being decoded. If not, then there is no double precision consumer to cause an SP producer/DP consumer conflict, and so the method proceeds to 565. If there is a double precision consumer in the fetch group, however, the method proceeds to 555. At 555 the method compares the register being modified by the active SP instruction in the pipe with the source registers specified by the double precision consumer instruction. This comparison is performed, in at least one embodiment, using the mask registers 460 and 470 illustrated in FIG. 2. If the method determines at 555 that the destination register of an active SP modifying instruction modifies the same register specified as a source of the double precision consumer instruction, the method generates an indication that an SP producer/DP consumer conflict exists at 560. Otherwise, the method begins checking for a DP producer/SP consumer conflict at 565.

At 565, the method checks whether there are any DP modifying instructions active in the pipe. As in 545, in at least one embodiment SP counter 440 and DP counter 450 (FIG. 2) are used for this purpose. If there are one or more active DP modifying instructions in the pipe, the method proceeds to 570. If not, then the method generates an indication that no conflict exists at 590.

At 570, the method determines if there is a single precision consumer instruction in the fetch group being decoded. If not, then there is no single precision consumer to cause a DP producer/SP consumer conflict, and so the method proceeds to 590. If there is a single precision consumer in the fetch group, however, the method proceeds to 575. At 575 the method compares the register being modified by the active DP instruction in the pipe with the source registers specified by the single precision consumer instruction. This comparison is performed, in at least one embodiment, using the mask registers 460 and 470 illustrated in FIG. 2. If the method determines at 555 that the destination register of an active DP modifying instruction modifies the same register specified as a source of the single precision consumer instruction, the method generates an indication that a DP producer/SP consumer conflict exists at 580. Otherwise, the method continues on to 590.

Those skilled in the art will appreciate that various techniques for comparing the registers specified as sources and/or destinations of instructions can be employed consistent with the teachings set forth herein. In addition, any number of signal generation techniques and/or hardware can be used to generate the signals discussed. It will also be appreciated that the order of action specified in methods 300 (FIG. 3) and 500 (FIG. 5) is flexible, and the various implementations may perform these actions in a different order than that illustrated.

Realizations in accordance with the present invention have been described in the context of particular embodiments. These embodiments are meant to be illustrative only and are not intended to be limiting. Many variations, modifications, additions, and improvements are possible and will become apparent to those skilled in the art upon consideration of the teachings set forth herein. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method comprising:

if a dependency exists between a greater width producer instruction and a lesser width consumer instruction, a processor modifying the lesser width consumer instruction by substituting for execution a greater width source register specifier for a lesser width source register specified in the lesser width consumer instruction;

the processor executing the greater width producer instruction and placing a result of the execution in the greater width source register; and the processor executing the lesser width consumer instruction using the greater width source register.

2. The method of claim 1 wherein the greater width source register substituted for the lesser width source register is the greater width register onto which the lesser width source register is aliased.

3. The method of claim 2, wherein substituting the greater width register includes setting an indication that the lesser width source register is to be replaced by the greater width register.

4. A method comprising:

determining, if a dependency exists between a greater width instruction and a lesser width instruction;

if a dependency exists between a greater width producer instruction and a lesser width consumer instruction, a processor modifying the lesser width consumer instruction by substituting for execution a greater width source register specifier for a lesser width source register specified in the lesser width consumer instruction, executing the greater width producer instruction and placing an execution result into the greater width source register, and executing the lesser width consumer instruction using the greater width source register; and if a dependency exists between a lesser width producer instruction and a greater width consumer instruction, the processor substituting plural instructions for the greater width consumer instruction and executing the plural instructions in stead of the greater width consumer instruction.

5. The method of claim 4 further including stalling at least one instruction of a fetch group if a dependency exists between an instruction in the fetch group and both an active lesser width producer instruction and an active greater width producer instruction, until at least one of the active lesser width producer instruction or the active greater width producer instruction is retired, and then resuming execution.

6. The method of claim 4 wherein the greater width source register substituted for the lesser width source register is the greater width register onto which the lesser width source register is aliased.

7. The method of claim 6, wherein substituting the greater width register includes setting an indication that the lesser width source register is to be replaced by the greater width register.

8. The method of claim 4, wherein the plural instructions substituted for the greater width consumer instruction include:
  a first instruction to merge plural lesser width registers aliased onto a first greater width source register of the greater width consumer instruction, the plural lesser width registers to be merged into a first temporary register;
  a second instruction to merge plural lesser width registers aliased onto a second greater width source register of the greater width consumer instruction the plural lesser width registers to be merged into a second temporary register; and
  a third instruction to execute the greater width consumer instruction using the first temporary register and the second temporary register as source registers.

9. The method of claim 4, wherein determining if a dependency exists includes:
  generating a first register mask identifying registers to be modified by lesser width instructions active in a pipeline; and
  generating a second register mask identifying registers to be modified by greater width instructions active in the pipeline.

10. The method of claim 9, wherein determining if a dependency exists includes:
  comparing a lesser width register specifier of an instruction against the second register mask; and
  comparing a greater width register specifier of an instruction against the first register mask.

11. The method of claim 4, wherein determining if a dependency exists includes determining if a greater width instruction in a fetch group modified a lesser width source register specified by a younger instruction in the same fetch group.

12. The method of claim 4, wherein determining if a dependency exists includes determining if a lesser width instruction in a fetch group modifies a greater width source register specified by a younger instruction in the same fetch group.

13. A method of handling a register conflict between a first instruction specifying a greater width destination register and a second instruction specifying a lesser width source register, the method comprising a processor executing the second instruction using the greater width destination register as a source instead of the lesser width source register.

14. The method of claim 13, wherein the register specified by the greater width source specifier is a greater width register onto which the register specified by the lesser width source register specifier is aliased.

15. The method of claim 13, wherein substituting the greater width register specifier includes setting an indication that the register specified by the lesser width source register specifier is to be replaced by the greater width register.

16. An instruction decode unit including
  logic to modify a lesser width consumer instruction by substituting a greater width source register specifier for a lesser width source register specifier in the lesser width consumer instruction if a dependency exists between a greater width producer instruction and the lesser width consumer instruction.

17. The instruction decode unit of claim 16 further including logic to prevent at least one instruction from being delivered for execution if a dependency exists between an instruction in the fetch group and both an active lesser width producer instruction and an active greater width producer instruction.

18. The instruction decode unit of claim 16, wherein the logic to substitute the greater width register specifier includes logic to set an indicator in the lesser width source register specifier indicating to that the lesser width source register is to be replaced by the greater width register.

19. A processor comprising:
  an instruction decode unit including:
  logic to modify a lesser width consumer instruction by substituting a greater width source register specifier for a lesser width source register specifier in the lesser width consumer instruction if a dependency exists between a greater width producer instruction and the lesser width consumer instruction, and
  logic to substitute plural instructions for a greater width consumer instruction if a dependency exists between a lesser width producer instruction and a greater width consumer instruction.

20. The processor of claim 19 further including logic to prevent at least one instruction from being delivered for execution if a dependency exists between an instruction in a fetch group and both an active lesser width producer instruction and an active greater width producer instruction, until at least one of the active lesser width producer instruction or the active greater width producer instruction is retired, and then resuming execution.

21. The processor of claim 19, wherein the logic to substitute the greater width register specifier includes logic to set a bit in the lesser width source register specifier indicating to that the lesser width source register is to be replaced by the greater width register.

22. The processor of claim 19, wherein the logic to substitute plural instructions for the greater width consumer instruction includes:
  logic to generate a first instruction to merge plural lesser width registers aliased onto a first greater width source register specified by the greater width consumer instruction, the plural lesser width registers being merged into a first temporary register;
  logic to generate a second instruction to merge plural lesser width registers aliased onto a second greater width source register specified by the greater width consumer instruction, the plural lesser width registers being merged into a second temporary register; and
  logic to designate the first temporary register and the second temporary register as source registers of the greater width consumer instruction.

23. The processor of claim 19, further including logic to determine if a greater width producer instruction that is part of a fetch group modifies a lesser width source register specified by a younger instruction in the same fetch group.

24. The processor of claim 19, further including logic to determine if a lesser width producer instruction that is part of a fetch group modifies a greater width source register specified by a younger instruction in the same fetch group.

25. A processor comprising
  means for determining if a dependency exists between a greater width instruction and a lesser width instruction;
  means for modifying, the lesser width instruction by substituting a greater width source register specifier for a lesser width source register specifier in the lesser width instruction if a dependency exists between a greater width produce instruction and a lesser width consumer instruction; and means for substituting plural instructions for the greater width consumer instruction if a dependency exists between a lesser width producer instruction find a greater width consumer instruction.

26. The processor of claim 25, further including means for stalling at least one instruction in a fetch group if a dependency exists between an instruction in the fetch group and both an active lesser width producer instruction and an active greater width producer instruction, until at least one of the active lesser width producer instruction or the active greater width producer instruction is retired, and then resuming execution.

27. The processor of claim 25, wherein the means for substituting plural instructions for the greater width consumer instruction include:

means for generating a first instruction to merge plural lesser width registers aliased onto a first greater width source register of the greater width consumer instruction, the plural lesser width registers being merged into a first temporary register;

means for generating a second instruction to merge plural lesser width registers aliased onto a second greater width source register of the greater width consumer instruction, the plural lesser width registers being merged into a second temporary register; and means for generating a third instruction to execute the greater width consumer instruction using the first temporary register and the second temporary register as source registers.

28. The processor of claim 25, wherein the means for determining if a dependency exists includes means for determining if a greater width destination instruction in a fetch group modifies a lesser width source register specified by a younger instruction in the same fetch group.

29. The processor of claim 25, wherein the means for determining if a dependency exists includes means for determining if a lesser width instruction in a fetch group modifies a greater width source register specified by a younger instruction in the same fetch group.

30. The processor of claim 19, wherein the instruction decode unit also includes: plural counters to track a number of instructions active in a pipeline;

plural mask registers to hold vectors indicating particular registers to be modified by active instructions; and logic to compare destination and source registers specified by the instructions against at least one of the plural mask registers to determine if a dependence exists between an instruction being decoded and an active instruction.

* * * * *

UNITED STATES PATENT AND TRADEMARK OFFICE
CERTIFICATE OF CORRECTION

PATENT NO. : 7,340,590 B1  Page 1 of 1
APPLICATION NO. : 10/734763
DATED : March 4, 2008
INVENTOR(S) : Sugumar et al.

It is certified that error appears in the above-identified patent and that said Letters Patent is hereby corrected as shown below:

On the face page, in field (56), under "Other Publications", in column 2, line 3, delete "naming.as" and insert -- naming as --, therefor.

On Sheet 1 of 5, in Fig. 1(Box 110), line 1, delete "SUBSYSTEM" and insert -- SUBSYSTEM --, therefor.

In column 10, line 59, in Claim 4, delete "in stead" and insert -- instead --, therefor.

In column 11, line 19, in Claim 8, delete "instruction" and insert -- instruction, --, therefor.

In column 11, line 41, in Claim 11, delete "modified" and insert -- modifies --, therefor.

In column 12, line 66, in Claim 25, delete "modifying," and insert -- modifying --, therefor.

In column 13, line 3, in Claim 25, delete "produce" and insert -- producer --, therefor.

In column 13, line 7, in Claim 25, delete "find" and insert -- and --, therefor.

In column 14, line 25, in Claim 30, delete "dependence" and insert -- dependency --, therefor.

Signed and Sealed this

Twenty-fourth Day of June, 2008

JON W. DUDAS
*Director of the United States Patent and Trademark Office*